July 4, 1933.   B. W. HARBAUGH ET AL   1,916,476
PUSHING AND PULLING IMPLEMENT
Filed May 18, 1929
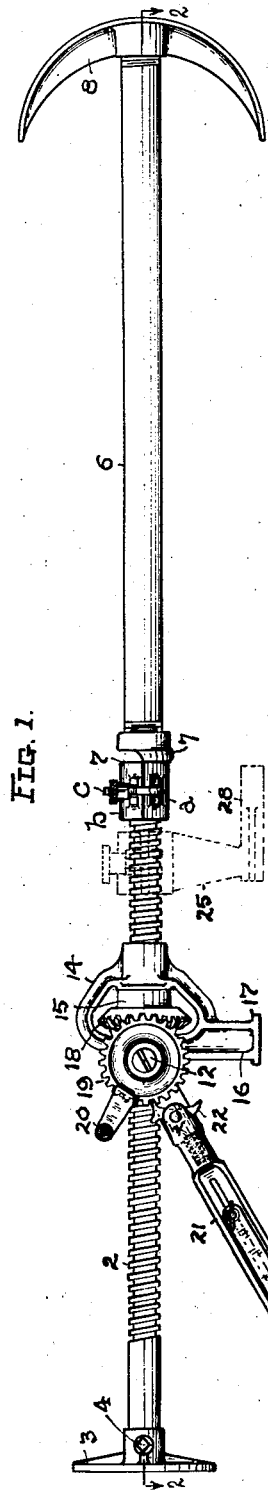
INVENTOR
B. W. Harbaugh
C. J. Smith
ATTORNEYS Patented July 4, 1933

1,916,476

UNITED STATES PATENT OFFICE

BRENT W. HARBAUGH AND CHARLES JACOB SMITH, OF ASHLAND, OHIO, ASSIGNORS TO THE ELITE MANUFACTURING COMPANY, OF ASHLAND, OHIO, A CORPORATION OF OHIO

PUSHING AND PULLING IMPLEMENT

Application filed May 18, 1929. Serial No. 364,210.

This invention pertains to an improvement in pushing and pulling implements, and consists of a tool or implement particularly designed and constructed to facilitate the repair of damaged automobiles. For example, the present tool may be used to spring or hold the fenders of an automobile in place; to straighten crooked fenders; to remove dents in the body or a fender; to remove deformed wheel housings; to straighten doors or a twisted frame or body, and so forth.

In the accompanying drawing, Fig. 1 is a side elevation of the tool on a reduced scale, and Fig. 2 a side elevation and sectional view thereof at right angles to Fig. 1. Figs. 3, 4, and 5, are side elevations of the three interchangeable heads for the tool. Fig. 6 is a side elevation of an adjustable nut and bracket attached to the screw member of the tool, and Fig. 7 is a sectional view thereof on line 7—7 of Fig. 6. Fig. 8 is a front view of the bracket shown in Fig. 6. Fig. 9 is a plan view of the opened coupling member attached to the extensible member of the tool, and Fig. 10 a transversal sectional view of the coupling member in closed position.

The tool or instrument comprises a relatively long screw shaft 2 rigidly connected to a plate 3. As shown, one end of screw shaft 2 is reduced in diameter and fastened by a set screw 4 within a socket or boss 5 on plate 3, which plate may be round, square or of other shape. An extensible member 6, in the form of a pipe or tube, is sleeved over the opposite end of screw shaft 2, and a coupling member or split nut is screw-connected with one end of this tube. Coupling member 7 includes a smoothly-finished semi-cylindrical extension $a$ and a screw-threaded semi-cylindrical section $b$ hinged thereto. A pivoted clamping screw and nut $c$ is provided to fasten the hinged section to the extension, so that the screw-threads on the hinged section will be positively engaged with the screw-threads on shaft 2, thereby permitting the tube or extensible member 6 to be screwed lengthwise on the shaft to either increase or decrease the working range of the tool. A more rapid adjustment and setting may be obtained by releasing the hinged section and disengaging its screw-threads on shaft 2, which permits the tube 6 to slide freely lengthwise of shaft 2. In other words, the split nut 7 permits uncoupling of the shaft and tube for quick adjustment.

The outer end of extensible member 6 is screw-threaded to permit different-shaped heads to be detachably connected therewith. Thus either a round or crescent-shaped head 8 (as delineated in Figs. 1 and 2) or a curved, flat or angular head 9, 10, and 11, respectively, (as shown in Figs. 3 to 5) inclusive, may be attached to member 6 to fit any part of a fender, frame, or body of corresponding shape and form.

A yoke 14 and a revoluble nut 15 are coupled together and sleeved on screw shaft 2 to provide means for imparting pushing and pulling movements to the object or part to be repaired or operated upon, the yoke being free to slide on shaft 2 and the nut being screw-connected therewith to move or shift the yoke in either direction relatively to plate 3 on shaft 2 or head 8 on extensible member 6. Yoke 14 includes a lateral arm 16 having an angular or hook-shaped extremity 17 adapted to hook over or press against an object when plate 3 and head 8 are engaged with or bear against different parts or places on an automobile.

The means for rotating nut 15 comprises a pair of bevel gears 18 and 19 respectively, gear 18 forming a fixed or integral part of the nut, and gear 19 being rotatably supported by a stud shaft 12 at one side of yoke 14. Operating gear 19 is adapted to be rotated by a crank handle 20, or by an oscillatory lever 21 having a reversible spring-pressed pawl 22 engageable with the teeth on gear 19. As shown, lever 21 includes a round hub 23 sleeved on stud shaft 12, and the operating gear 19 is sleeved over this hub and held in place by a washer 24.

To extend the usefulness of the tool, we also provide a supplementary bracket 25 adapted to be clamped upon screw shaft 2 to co-act with yoke 14 in pushing and pulling operations.

Bracket 25 has a divided hub 26 which is screw-threaded to interlock with the screw-threads on shaft 2, and a hinged thumb-screw and nut 27 serves to clamp the divided parts of the hub tightly upon the shaft. Bracket 25 may be rotated around shaft 2 to place its bifurcated or forked arm 28 opposite or in line with arm 16 on yoke 14, and being detachable from shaft 2 the positions of the bracket 25 may also be reversed, that is, the forked arm 28 may be projected toward yoke 14 or away from it. Yoke 14 being also rotatable on shaft 2 its arm 16 may be projected in any direction radially of the shaft. Thus, in Fig. 1, we show yoke 14 and supplemental bracket 25 (in full and dotted lines respectively) projecting in the same direction from shaft 2. Obviously, these parts may be rotated to project in any direction, than as delineated, and the tool may be used in different ways and applied to many places on an automobile for repair purposes. Thus, the forked arm 28 may be seated against the hub of a wheel, or against a shaft or corner of a frame, and arm 16 employed to press against or pull another part, such as a housing, fender or the like, either to remove, replace or repair it. The forked arm 28 and head 8 may also be used to anchor or support the tool upon a damaged automobile body, and arm 16 on yoke 14 employed to either push or pull another part into its proper place.

What we claim is:

A push and pull implement, including a screw shaft, a tubular extension for said shaft axially aligned therewith, a coupling including a semi-cylindrical section and a screw-threaded semi-cylindrical section hinged together and releasably connected with said screw shaft, and work-engaging means upon said parts.

In testimony whereof we hereby affix our signatures.

BRENT W. HARBAUGH.
CHARLES JACOB SMITH.